US012469590B2

(12) United States Patent
Sharma et al.

(10) Patent No.: US 12,469,590 B2
(45) Date of Patent: Nov. 11, 2025

(54) MEDICAL IMAGE PROCESSING USING ARTIFICIAL INTELLIGENCE

(71) Applicant: GE Precision Healthcare LLC, Wauwatosa, WI (US)

(72) Inventors: Ashish Kumar Sharma, Karnataka (IN); Mohit Dwivedi, Deerfield, IL (US); Timothy Rose, Pewaukee, WI (US)

(73) Assignee: GE Precision Healthcare LLC, Wauwatosa, WI (US)

( * ) Notice: Subject to any disclaimer, the term of this patent is extended or adjusted under 35 U.S.C. 154(b) by 467 days.

(21) Appl. No.: 18/171,052

(22) Filed: Feb. 17, 2023

(65) Prior Publication Data

US 2024/0282432 A1    Aug. 22, 2024

(51) Int. Cl.
*G16H 30/20* (2018.01)
*G06N 20/00* (2019.01)
*G06T 7/00* (2017.01)
*G16H 50/70* (2018.01)

(52) U.S. Cl.
CPC ............. *G16H 30/20* (2018.01); *G06N 20/00* (2019.01); *G06T 7/0016* (2013.01); *G16H 50/70* (2018.01)

(58) Field of Classification Search
CPC ........ G16H 30/20; G16H 50/70; G06N 20/00; G06T 7/0016

USPC ........................................................ 382/128
See application file for complete search history.

(56) References Cited

U.S. PATENT DOCUMENTS

| 9,742,937 | B2 | 8/2017 | Park et al. | |
|---|---|---|---|---|
| 10,862,836 | B2 | 12/2020 | McGregor, Jr. et al. | |
| 2020/0211692 | A1* | 7/2020 | Kalafut | G16H 30/40 |
| 2022/0050870 | A1 | 2/2022 | Kale et al. | |
| 2023/0051436 | A1* | 2/2023 | Ahmad | G16H 50/70 |
| 2023/0410223 | A1* | 12/2023 | Dobson | G16H 15/00 |
| 2024/0363220 | A1* | 10/2024 | Neumann | G16H 50/70 |
| 2025/0037870 | A1* | 1/2025 | Sue | G16H 50/20 |

* cited by examiner

*Primary Examiner* — Allen H Nguyen

(57) ABSTRACT

A method includes receiving an image of a portion of a body of a patient. The image was acquired using a first modality. The method also includes receiving a selection of an area of interest of the image, receiving secondary information about the image, the patient, or both, predicting, using a machine learning model, one or more relevant case histories in a database including case histories and images captured in a plurality of modalities including at least one modality that is different from the first modality. The images are each linked with at least one case history, and the machine learning model is trained to predict the one or more relevant case histories based at least partially on the image, the area of interest, and the secondary information. The method also includes displaying data representing the one or more relevant case histories.

20 Claims, 9 Drawing Sheets

| Full image | Annotated image | Changed parameter on the fly | Header 1 | Header 2 | Header 4 | Header 5 | Header 6 | Header N | Label Report |
|---|---|---|---|---|---|---|---|---|---|
| 302 | 304 | Contrast(WW/W L), annotation coordinates, Area of the marked annotation, etc | Modality: XA (0008, 0060) | Slice location: (0020, 0030) | Pixel spacing (0028, 0030) | Image Position (Patient) (0020, 0037) | View position: AP - Anterior/Posterior PA - Posterior/Anterior LL - Left - Lateral RL - Right Lateral RLD - Right Lateral Decubitus LLD - Left Lateral Decubitus RLO - Right Lateral Oblique LLO - Left Lateral Oblique (0018,5100) | All tags that can be used to identify the property of the image. | A linked report |
| | | 306 | 308 | 310 | 312 | 314 | 316 | 318 | 320 |

| Full image | Annotated image | Changed parameter on the fly | Header 1 | Header 2 | Header 4 | Header 5 | Header 6 | Header 7 | Header N | Label Report |
|---|---|---|---|---|---|---|---|---|---|---|
| 402 | 404 | annotation coordinates, Area of the marked annotation. | Modality: MG (0008, 0060) | Patient Age | Gender | Imaging procedure code | Body weight | View position: CC,MLO (0018, 5101) | Image laterality: R/L (0020, 0037) | All tags that can be used to identify the property of the image. | A linked report |
| | | 406 | 408 | 410 | 412 | 414 | 416 | 418 | 420 | 422 | 424 |

MEDICAL IMAGE PROCESSING USING ARTIFICIAL INTELLIGENCE

BACKGROUND

The subject matter disclosed herein relates to medical imaging and, in particular, to building artificial intelligence to assist in searching a multi-modality image and patient case history database to find relevant patient case histories to facilitate interpretation of medical images, among other things.

In medical imaging, typically an operator (e.g., a technician) acquires a medical image from a patient using one of many available modalities. The images can be acquired once, or several times at different stages, whether single images or several in series. For example, a physician may order X-rays, CT scans, MRIs, PET scans, etc., of a particular area, which the technician acquires from the patient using appropriate imaging devices. Different technicians may acquire the images slightly differently for a variety of reasons, for example, acquiring data of a given portion of the body from different angles, etc.

Before, during, or shortly after this image-acquisition process, information about the patent (e.g., demographics) and the image itself (e.g., pixel intensity) is embedded within the image file itself, e.g., using the industry-standard DICOM image format. Further, a case history for the patient may be developed, which may be linked to the patient and the images in a database. Briefly, in a DICOM image file, the first few packets of information are the header. The header can store demographic information about the patient, acquisition parameters for the imaging study, image dimensions, matrix size, color space, etc. This information can assist viewing software to accurately display the image.

Interpreting the image generally requires expert human medical review. Presently, a user (e.g., a radiologist) reviews the image and annotates the image with his/her findings. For example, particular regions may be highlighted. Additionally, a user may make an inference/conclusion about a patient's condition based at least in part on the image, as well as the user's background knowledge and expertise. Such information, along with the images, can contribute to the case history that is built for the patient. It may also provide information about the image, e.g., what aspects were most relevant to the medical condition of the patient in the image.

Many such medical images are acquired and interpreted every day, resulting in a large corpus of information available for a range of patients from different demographics with different medical conditions and individual case histories. This presents a wealth of information that may be useful for doctors and technicians to use to assist with individual image interpretation going forward. Thus, it may be useful to search through this information down and identify similar images and the case histories associated therewith, in order to learn from other, past experiences with similarly-situated patients. However, such large and complex datasets can be unwieldy to parse through. Therefore, presently, such review is limited, because image searches of different modalities (e.g., X-ray vs. MRI) of even the same body part at a similar location can prove difficult. Moreover, even within a given modality, searching for relevant case histories can be cumbersome, because different image perspectives, settings, patient conditions, etc. can hamper traditional image-searching techniques. Further, different patents may not be similarly situated, despite images being somewhat similar, but may have different risk or demographic features that either make their images more or less relevant.

SUMMARY

Certain implementations commensurate in scope with the originally claimed subject matter are summarized below. These implementations are not intended to limit the scope of the claimed subject matter, but rather these implementations are intended only to provide a brief summary of possible forms of the subject matter. Indeed, the subject matter may encompass a variety of forms that may be similar to or different from the implementations set forth below.

Implementations of the present disclosure include a method that includes receiving an image of a portion of a body of a patient. The image was acquired using a first modality. The method also includes receiving a selection of an area of interest of the image, receiving secondary information about the image, the patient, or both, predicting, using a machine learning model, one or more relevant case histories in a database including case histories and images captured in a plurality of modalities including at least one modality that is different from the first modality. The images are each linked with at least one case history, and the machine learning model is trained to predict the one or more relevant case histories based at least partially on the image, the area of interest, and the secondary information. The method also includes displaying data representing the one or more relevant case histories.

In some implementations, the image is stored in an image file including a header that represents the secondary information, the secondary information comprising an identification of the first modality, demographic data of the patient, and information about acquisition parameters of the image.

In some implementations, the method also includes receiving one or more manual search parameters that limit the relevant case histories.

In some implementations, the method also includes ranking the one or more relevant case histories based on a confidence level associated therewith by the machine learning model.

In some implementations, the method also includes adjusting the machine learning model in response to a user identifying at least one of the one or more relevant case histories as being relevant.

In some implementations, the method also includes receiving a plurality of training images, selections of one or more areas of interest within the respective training images, and secondary information about the respective training images, patients from which the respective training images were captured, or both, obtaining case histories of patients associated with the plurality of training images, linking the case histories with the training images, the selections of the one or more areas of interest, and the secondary information in the database, and training the machine learning model, using the training images, the one or more areas of interest, and the secondary information linked with the case histories, to predict relevant case histories based on an image, one or more areas of interest within the image, and secondary information.

In some implementations, the method also includes parsing the case histories using natural language processing. In such implementations, training the machine learning model includes training using the parsed case histories.

In some implementations, the case histories each include at least one of an examination report, a discharge report, or a test result about a patient.

In some implementations, the one or more relevant case histories are used to interpret the image.

Implementations of the present disclosure include a computing system that includes one or more processors, and a memory system including one or more non-transitory, computer-readable media storing instructions that, when executed by at least one of the one or more processors, cause the computing system to perform operations. The operations include receiving an image of a portion of a body of a patient. The image was acquired using a first modality. The operations also include receiving a selection of an area of interest of the image, receiving secondary information about the image, the patient, or both, predicting, using a machine learning model, one or more relevant case histories in a database including case histories and images captured in a plurality of modalities including at least one modality that is different from the first modality. The images are each linked with at least one case history, and the machine learning model is trained to predict the one or more relevant case histories based at least partially on the image, the area of interest, and the secondary information. The operations also include displaying data representing the one or more relevant case histories.

In some implementations, the image is stored in an image file including a header that represents the secondary information, the secondary information comprising an identification of the first modality, demographic data of the patient, and information about acquisition parameters of the image.

In some implementations, the operations also include receiving one or more manual search parameters that limit the relevant case histories.

In some implementations, the operations also include ranking the one or more relevant case histories based on a confidence level associated therewith by the machine learning model.

In some implementations, the operations also include adjusting the machine learning model in response to a user identifying at least one of the one or more relevant case histories as being relevant.

In some implementations, the operations also include receiving a plurality of training images, selections of one or more areas of interest within the respective training images, and secondary information about the respective training images, patients from which the respective training images were captured, or both, obtaining case histories of patients associated with the plurality of training images, linking the case histories with the training images, the selections of the one or more areas of interest, and the secondary information in the database, and training the machine learning model, using the training images, the one or more areas of interest, and the secondary information linked with the case histories, to predict relevant case histories based on an image, one or more areas of interest within the image, and secondary information.

In some implementations, the operations also include parsing the case histories using natural language processing. In such implementations, training the machine learning model includes training using the parsed case histories.

In some implementations, the case histories each include at least one of an examination report, a discharge report, or a test result about a patient.

In some implementations, the one or more relevant case histories are used to interpret the image.

Implementations of the present disclosure include a non-transitory, computer-readable medium storing instructions that, when executed by at least one processor of a computing system, cause the computing system to perform operations. The operations include receiving an image of a portion of a body of a patient. The image was acquired using a first modality. The operations also include receiving a selection of an area of interest of the image, receiving secondary information about the image, the patient, or both, predicting, using a machine learning model, one or more relevant case histories in a database including case histories and images captured in a plurality of modalities including at least one modality that is different from the first modality. The images are each linked with at least one case history, and the machine learning model is trained to predict the one or more relevant case histories based at least partially on the image, the area of interest, and the secondary information. The operations also include displaying data representing the one or more relevant case histories.

In some implementations, the image is stored in an image file including a header that represents the secondary information, the secondary information comprising an identification of the first modality, demographic data of the patient, and information about acquisition parameters of the image.

In some implementations, the operations also include receiving one or more manual search parameters that limit the relevant case histories.

In some implementations, the operations also include ranking the one or more relevant case histories based on a confidence level associated therewith by the machine learning model.

In some implementations, the operations also include adjusting the machine learning model in response to a user identifying at least one of the one or more relevant case histories as being relevant.

In some implementations, the operations also include receiving a plurality of training images, selections of one or more areas of interest within the respective training images, and secondary information about the respective training images, patients from which the respective training images were captured, or both, obtaining case histories of patients associated with the plurality of training images, linking the case histories with the training images, the selections of the one or more areas of interest, and the secondary information in the database, and training the machine learning model, using the training images, the one or more areas of interest, and the secondary information linked with the case histories, to predict relevant case histories based on an image, one or more areas of interest within the image, and secondary information.

In some implementations, the operations also include parsing the case histories using natural language processing. In such implementations, training the machine learning model includes training using the parsed case histories.

In some implementations, the case histories each include at least one of an examination report, a discharge report, or a test result about a patient.

In some implementations, the one or more relevant case histories are used to interpret the image.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein:

FIG. 3 illustrates a flowchart of a method for predicting relevant results for medical images using a trained machine learning model, according to an example.

FIG. 4 illustrates a training image and header associated therewith, according to an example.

DETAILED DESCRIPTION OF AN EXAMPLE IMPLEMENTATION

Figure 1:
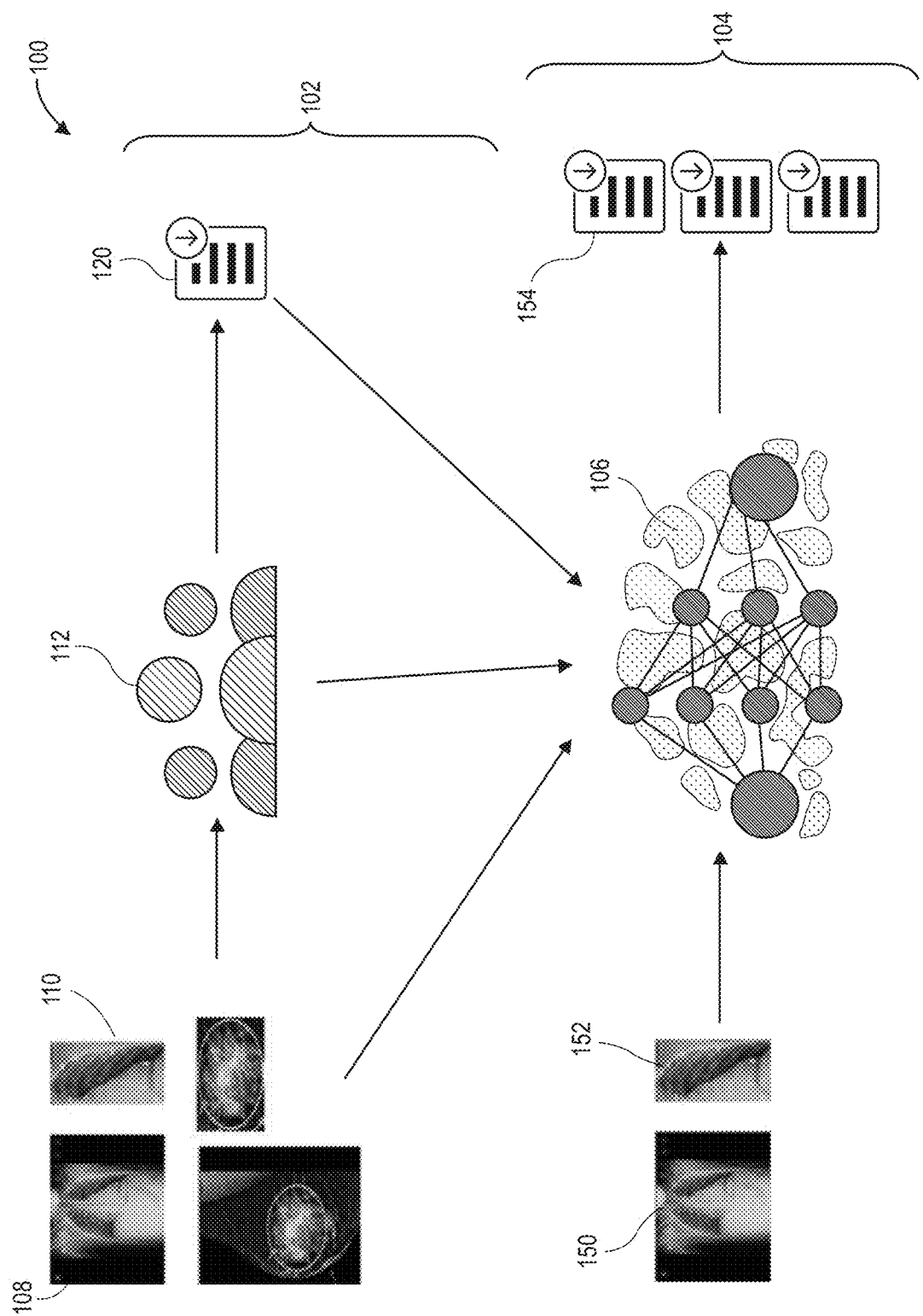
FIG. 1 illustrates a simplified block diagram of a system for predicting relevant results for aid in interpreting medical images, according to an example.

| Element | Reference Number |
|---|---|
| Workflow | 100 |
| Training phase | 102 |
| Implementation phase | 104 |
| Machine learning model | 106 |
| Raw training images | 108 |
| Area of interest | 110 |
| Human perceptions | 112 |
| Case history | 120 |
| Input image | 150 |
| Interest | 152 |
| Method | 200 |
| Database entry | 300 |
| Image | 302 |
| Area of interest | 304 |
| Header | 306 |
| Header | 308 |
| Header | 310 |
| Header | 312 |
| Header | 314 |
| Header | 316 |
| Header N | 318 |
| Case history | 320 |
| Database entry | 400 |
| Image | 402 |
| Area of interest | 404 |
| Header | 408 |
| Header | 410 |
| Header | 412 |
| Header | 414 |
| Header | 416 |
| Header | 418 |
| Header | 420 |
| Header N | 422 |
| Report | 424 |
| Method | 500 |
| Method | 600 |
| User interface | 700 |
| Image | 702 |
| X-ray | 702 |
| Separate window | 704 |

-continued

| Element | Reference Number |
|---|---|
| Manual search parameters | 800 |
| Button | 900 |
| List of predicted case histories | 1000 |
| Computing system | 1100 |
| Analysis module | 1102 |
| processor s | 1104 |
| storage media | 1106 |
| network interface | 1107 |
| machine learning search module | 1108 |
| data network | 1109 |
| individual computer system | 1101A |
| computer systems | 1101B |
| computer systems | 1101C |

One or more specific implementations will be described below. In an effort to provide a concise description of these implementations, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various implementations of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed implementations. As used herein, the term "image" broadly refers to both viewable images and data representing a viewable image. Furthermore, the term processor or processing unit, as used herein, refers to any type of processing unit that can carry out the required calculations needed for the various implementations, such as single or multi-core: CPU, Accelerated Processing Unit (APU), Graphics Board, DSP, FPGA, ASIC or a combination thereof.

The present disclosure addresses the challenges noted above and/or others by implementing an artificial intelligence medical imaging and case history database search system and method. In particular, the present disclosure may permit users (e.g., radiologists) to quickly access and refer to relevant, previously-acquired data from other patients, which the machine learning model predicts will be relevant to the current case (e.g., the condition of the patient from which a searched image is acquired). Further, the radiologists can refine search based on multiple parameters, such as image capture modality, age, laterality, gender, etc. The radiologists (or other users) can thus leverage a large database of previously-acquired data for use in remote consultation, avoiding ambiguity in reading and interpreting new studies, and learning from prior reports. Moreover, implementations of the present disclosure can avoid time-consuming, and often inaccurate, word-searching of databases, or overly-limiting image searches. For example, present implementations can combine aspects of image and text searching by using predictive modeling to return case histories that are likely to be relevant to the user, based on the images, and more specifically, selections of areas of interest within the images, as well as secondary information related to the image, the patient, or both.

Turning now to the specific, illustrated examples, FIG. 1 depicts a workflow 100 for an artificial intelligence system that is trained to search databases of medical images and case histories to find relevant case histories. In particular, the workflow 100 may generally include a training phase 102 and an implementation phase 104. In the training phase 102, a machine learning model 106 may be trained to undertake the searching functionality. "Machine learning model" is broadly used herein to refer to any of the various types of artificial intelligence, including autonomous and semi-autonomous decision-making (e.g., segmentation, classification, etc.) computing techniques. For example, neural networks, decision trees, etc., are types of machine learning models that can be used to predict an output given an input, based on patterns in training data. Moreover, the machine learning model 106 may be of any suitable type that can be trained based on a corpus of training data, generally a pair of inputs and outputs, to predict the output, given the input.

In the present example, a supervised learning technique is employed, in which the machine learning model 106 is fed a corpus of labeled training data, i.e., input-output pairs. From these pairs, connections are made, based on patterns in the data, which result in the machine learning model 106 being configured to predict what the output will be, given the input. In this case, the input may include raw training images 108. The raw training images 108 may be any type of image, generally of a part of a human's body. For example, as shown, X-rays and mammograms may be two type of images (modalities) that are acquired for use in the workflow 100. Any other type of modality can also be used, such as CT scans, PET scans, MRIs, etc.

Further, the raw training images 108 can undergo initial selection by a human user. For example, a human can select an area of interest, as shown in 110, within each of the images 108. The area of interest 110 may also be part of the input data, of the input-output pairing mentioned above for the training data. The area of interest 110 may represent the same visual image as the raw image 108, but with extraneous information removed (e.g., a cropped section). The selected area of interest 110 may also include annotations entered by a user. An artificial intelligence (e.g., machine learning model) can be trained to select the area of interest, or a human user can identify the area of interest during or after image acquisition.

The raw image 108, the selected area of interest 110, or both can include secondary information associated therewith, e.g., stored in a DICOM (or any other type of) header embedded in the image file. Such secondary information may also be included in the input data of the input-output training pair. The input data (e.g., the raw image 108, the selected area of interest 110, and the secondary information) may also be referred to herein as "first data", with the output (e.g., case histories, as discussed below) associated therewith being referred to herein as "second data". This secondary information may be at least partially populated by human users viewing the image 108, as indicated at 112; that is, human perceptions are added using the secondary information potentially along with computer-generated information. In some examples, the secondary information may include data about the image 108, about the patient from which the image was acquired, or both. The header information may be considered "secondary" in that it is not the primary, visual image data, but information related thereto, although this should not be interpreted to mean that the secondary information is less important. The secondary information may include information about the acquisition parameters of the image, such as modality, image laterality, imaging procedure, imaging protocol, stage (e.g., in staged protocol exams in which two or more images are acquired in different time intervals), contrast, view position, etc., as well as patient individual and demographic information such as age/patient age, gender, ethnic group, body weight, body mass index (BMI), etc. This header information can thus be numerical or text-based and searchable.

The image 108, the selected area of interest 110, and secondary information from human perceptions 112 can be linked to or otherwise paired with a case history 120, e.g., the output or "second data" noted above. Such case histories may include human perceptions about a patient and thus may be at least partially made up of free-form text. Accordingly, the case histories may be processed using natural language processing (NLP) to establish clinical keywords (e.g., topics), test results, test variable ranges, etc. Briefly, NLP may employ machine learning models (which may be part of or separate from the machine learning model 106 of FIG. 1) to process and analyze large amounts of natural language data, e.g., such that the computer is capable of "understanding" the contents of documents, including the contextual nuances of the language within them. The technology can then accurately extract information and insights contained in the documents as well as categorize and organize the documents themselves. For example, many different classes of machine-learning algorithms have been applied to natural-language-processing tasks. These algorithms take as input a large set of features that are generated from the input data. In particular, deep-learning NLP systems may be used.

The case histories may also include more structured data, entered, e.g., via fields, menus, radio buttons, etc. The case histories may include radiologist test reports, diagnosis results from discharge summaries, tests results that give yes/no results, test results that give numerical range results (e.g., relative to a normal range). Thus, the workflow 100 may include aggregating and processing (e.g., NLP) the case histories from a variety of text-based sources.

The case histories provide information about the patient, from whom the medical image is taken, that may not be readily gleaned from the image alone. The two sets of data, the images/secondary information and the case histories, generally represent the same patient in the same condition, and thus are tied together in reality, but the link may not be readily apparent from the image alone. Accordingly, the case histories provide information about an image may be useful to subsequent viewers of other images. For example, case histories may reveal a particular outcome, test result, diagnosis, etc. associated with the patient represented by the image. This may be useful to viewers of similar images in order to gain an understanding of the condition of the patient without having the benefit of the full case history (e.g., tests that have not yet occurred, results that have not yet happened).

Once the training data is collected, it may be used to train the machine learning model 106. First data, that is, e.g., the images 108, the selected areas of interest 110, and the secondary information from human perception 112, may be paired with second data, the case histories 120 (e.g., the characteristics of the case histories as determined by NLP, test results, and other techniques for parsing through patient data). These pairings may be considered "ground truths" for the machine learning training. The machine learning model 106 may thus be trained to find patterns that link together the first data and the second data, which thus permit entry of the first data to yield predictions about the second data. Such predictions may then be employed to find relevant second data, e.g., case histories, given the first data.

In at least some embodiments, the training data (first data and second data) may be accessible to the machine learning model 106 in a database. It will be appreciated that for privacy considerations, however, individual patient identifications may be removed or otherwise omitted from the images and case histories when stored for retrieval later.

Although a supervised learning process, in which pairs of input-output data are fed to the machine learning model 106, is discussed herein, the process could also be at least partially unsupervised. For example, the input may be vectorized or otherwise put into a feature space and, e.g., clustered. The case histories may also be rendered in a coordinate space, and the combination of the two could be used to predict outputs (coordinates of "nearby" in features space, and thus potentially relevant case histories).

Moving to the implementation phase 104, the machine learning model 106 may receive an image 150, a selection of an area of interest 152 therein, and secondary information (e.g., information stored in a DICOM header) representing information about the patient and/or one or more characteristics of the image as populated by a human, a computer, or both. The machine learning model 106 may then predict those case histories in the database that are likely relevant to the input it has received, based on the image 150, the selected area of interest 152, and/or the secondary information.

The machine learning model 106 may accomplish this by capitalizing on patterns in the input-output connections. That is, the case histories are linked to images, areas of interest, secondary information, which all provide attributes. The machine learning model may not name or parse these attributes explicitly, but may use the patterns that it has been trained to recognize to find case histories that are linked to similar inputs as provided by the image 150, the selected area of interest 152, and the secondary information received. These case histories may thus be considered potentially relevant to a user interpreting the image 150.

Further, the database of case histories may include those input-output pairings that were used to train the machine learning model 106. The database may also include other parings of first data and second data, such that only a portion of the available parings are used for training, while a larger set is available for searching. Further, the database may include images captured using same modality as the input image 150 or a different modality; moreover, the database may include images captured in several different modalities, such that an image search relying only on the input image 150 would have difficulty searching through the different modalities to find matches.

Figure 2:
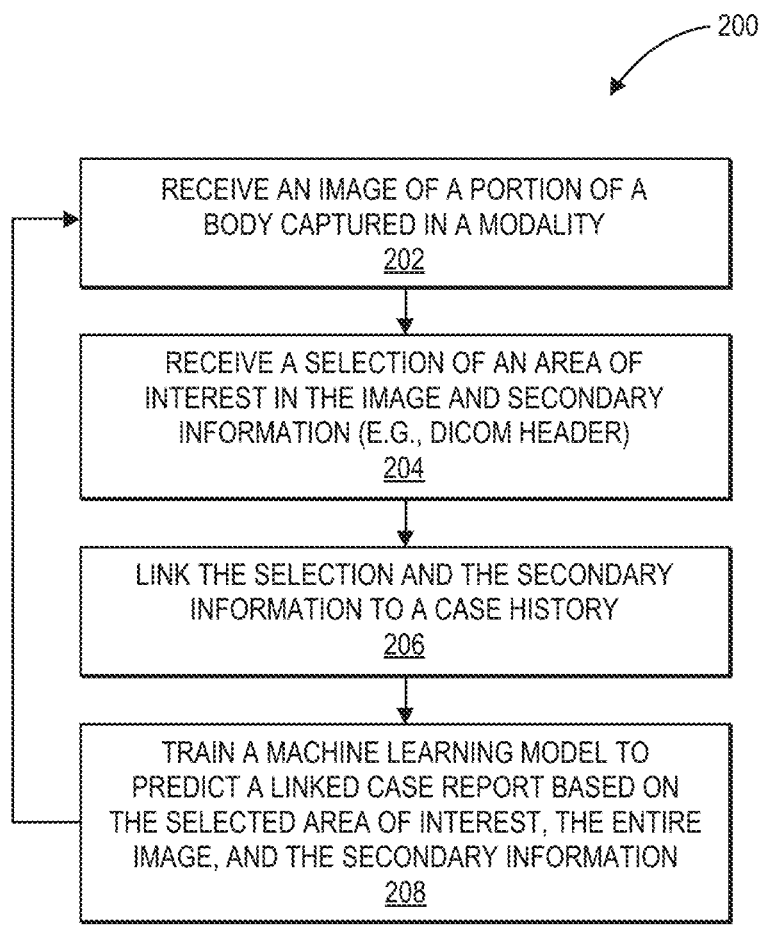
FIG. 2 illustrates a flowchart of a method for training a machine learning model to predict relevant results for medical images, according to an example.

FIG. 2 illustrates a flowchart of a method 200 for training the machine learning model 106 of FIG. 1, according to an example. The method 200 may be an example implementation of the training phase 102 of the workflow 100 discussed above with reference to FIG. 1. Although illustrated in a specific order, it will be appreciated that the worksteps may be executed in any order, without departing from the scope of the present disclosure. Further, individual worksteps may be executed in parallel or iterated two or more times before proceeding to a subsequent worksteps. Additionally, individual worksteps may be partitioned into two or more worksteps, or any two or more of the worksteps may be combined into one.

The method 200 may include receiving an image of a portion of a body (e.g., of a patient, which may be a human), as at 202. The image is captured using a modality, which may define what type of image is provided. As noted above, there are various suitable modalities, such as X-ray, MRI, CAT scan, PET scan, mammogram, etc., that may be employed to capture the image.

The method 200 may also include receiving a selection of an area of interest within the image and secondary information, as at 204. In some embodiments, the selection and the area of interest is entered at least partially by a human, e.g., a radiologist or a technician. The area of interest may be graphically indicated directly in a visualization of the image (e.g., using a bounding box or circle). The secondary information may be embedded in a header in the image file, e.g., a DICOM file. The secondary information may include modality, image laterality, patient age, gender, ethnic group, body weight, BMI, imaging procedure code, imaging protocol identification, stage, contrast, view position, etc. The secondary information may also specify the location, e.g., relative to the image and/or the patient's bod, where the area is selected.

The method 200 may further include linking (e.g., pairing, associating, etc.) the image, the selection, and/or the secondary information to a case history (or "summary report"), as at 206. The case history may provide information about the patient from whom the image was captured. In particular, the case history may provide information relevant to the image, but which is not readily gleaned from the image itself, e.g., without the aid of additional tests, observations, examinations, etc. The case history may be at least partially text-based, and may be processed using NLP techniques and/or other techniques in order to establish characteristics about the report itself, including test results, discharge reports, etc. Thus, the image, the selection, and the secondary information may be paired with the case history (e.g., characteristics thereof, as represented by the NLP output). The machine learning model may thus be trained to predict attributes of relevant case histories based on given inputs (images, selections, and secondary information), and thus to select case histories that are potentially relevant based on the images and secondary information associated therewith, as well as the characteristics thereof.

For example, FIG. 3 illustrates an example of a database entry 300 of the linked first data (image, selection, and secondary information) with the second data (case history). The illustrated example database entry 300 includes an image 302 and a selected area of interest 304 therefrom, which has been annotated, e.g., by a human user. The database entry 300 also includes headers 306, 308, 310, 312, 314, 316, 318. The header 306 may represent parameters that were adjusted during the annotation phase by a user, e.g., contrast, annotation (selection) coordinates, area of marked annotated, etc. The header 308 may indicate a code for the modality of the image. The header 310 may represent a location in the body where the image 302 was taken (e.g., a slice location). The header 312 may represent a pixel spacing or another characteristics of the image. The header 314 may represent an image position or the patient. The header 314 may represent a view position, e.g., perspective, of the image. For example, the header 316 may represent whether the view position is anterior or posterior, left lateral, right lateral, etc., as indicated in the Figure. Any number of headers may be employed, as indicated by header N 318, where N can be any counting number. As such, those headers described above are merely examples.

The database entry 300 may also include a linked report 320. The linked report 320 may be the case history, e.g., human perceptions, test reports, etc., associated with the image, the patient, or both. That is, the second or output data associated with the first or input data, represented by images and headers 302-318. The case history may include information that is not able to be gleaned directly from viewing the image; however, the image, in combination with the case history, may provide insights as to what other tests were relevant/helpful to reach conclusions or otherwise inform a physician about a patient's condition. The case history may be parsed using NLP or any other technique that may provide attributes to the case history that may be linked to the first data in the database entry 300. Accordingly, each image in each database entry (e.g., the database entry 300) may be linked to one or more case histories, along with the human perceptions, other header information, etc.

FIG. 4 illustrates another database entry 400, i.e., a pair of image/secondary (header) information and a linked report, according to an example. As shown, an image 402 is provided, along with an annotation 404 thereof, which may be made by a human user. The parameter(s) that is (are) changed on the fly my also be indicated at 406, e.g., in this case, annotation coordinates, and area of the marked annotation. Headers 408, 410, 412, 414, 416, 418, 420, and 422 may be provided. Header 408 may provide the modality (e.g., mammogram), header 410 may indicate the patient's age, header 412 may indicate the patient's gender, header 414 indicates the imaging procedure code, header 416 indicates body weight, header 418 indicates view position, header 420 indicates image laterality. Header N 422 indicates that any number of headers could be employed.

The database entry 400 may also include a linked report 424, which may be the second of the "pair" of data. That is, the machine learning model (e.g., the model 106 of FIG. 1) may be trained to predict characteristics of the linked report based on the inputs (the image 402, annotated image 404, and secondary information represented by the headers 406-420).

Figure 5:
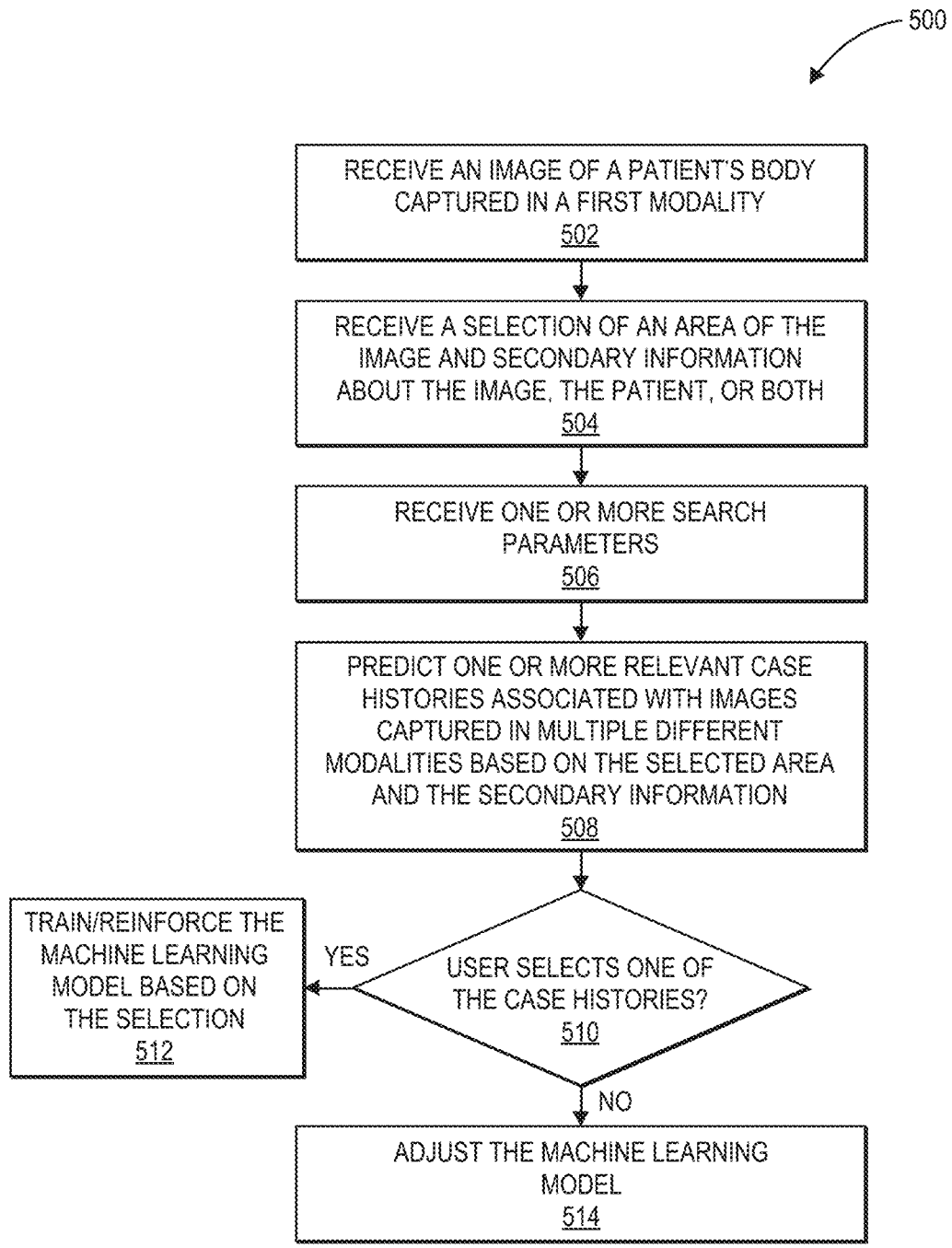
FIG. 5 illustrates a relevant result returned by the trained machine learning model, according to an example.

FIG. 5 illustrates a flowchart of a method 500 for implementing a trained machine learning model, e.g., the machine learning model 106 of FIG. 1 after applying the supervised training method 200 of FIG. 2, according to an example. For example, the method 500 may be an example implementation of the implementation phase 104 of FIG. 1. Although illustrated in a specific order, it will be appreciated that the worksteps of the method 500 may be executed in any order, without departing from the scope of the present disclosure. Further, individual worksteps may be executed in parallel or iterated two or more times before proceeding to a subsequent worksteps. Additionally, individual worksteps may be partitioned into two or more worksteps, or any two or more of the worksteps may be combined into one.

The method 500 may include receiving an image of a patient's body captured in a first modality, as at 502. For example, the first modality might be an X-ray or an MRI, but the database of images accessible to the user may contain images of many other modalities, such as CAT scans, PET scans, mammograms, etc. Because it contains images of potentially any modality, the database may be referred to as a "multi-modality" database.

The method 500 may also include receiving a selection of an area of the image as well as secondary information about the image, the patient, or both, as at 504. The selection of the area of interest may be manual, e.g., by a user, or may be at least partially automated by an artificial intelligence executing a trained function. The secondary information may be header information, as discussed above with respect to the examples provided herein. The secondary information may be at least partially populated by a user (e.g., patient demographics information) and/or partially populated by the computing system (e.g., image location, selected area location information, etc.).

In at least some embodiments, the image is stored in an image file that includes the selection (e.g., coordinates thereof) and the secondary information. For example, the secondary information may include one or more headers that represent information such as an identification of the first modality, demographic data of the patent, and information about the acquisition parameters of the medical image.

The method 500 may, in some examples, also include receiving one or more (e.g., manual) search parameters, as at 506. These search parameters may be configured to narrow a search, e.g., manually according to user preferences, away from certain results. For example, a user may exclude patients outside of a certain age range, gender, race, location, height, weight, BMI, etc. Thus, rather than sifting through what may appear to be relevant results, but the user knows (or believes) are not relevant, the user may exclude these results beforehand. The search parameters may also specify certain aspects that are more important than others to the search, for example, looking for search results from patients with certain specific demographics, but not excluding others.

The method 500 may then include predicting one or more relevant case histories associated with images captured in multiple different modalities based on the image, the selected area, the secondary information, and the search parameters, as at 508. This may be achieved by reference to a database of case histories and associated images and secondary information, as noted above. The relevant case histories may have been processed via NLP techniques to recognize themes, words, topics, test results, diagnoses, medical conditions, etc. The machine learning model may thus have been trained to find the relevant case histories, based on a combination of the image(s) associated therewith, the secondary information about the image/patient, and potentially from characteristics about the relevant case history itself. The machine learning model may rank or otherwise order the results in terms of a confidence level in the relevance, or another score related to how relevant the machine learning model considers the results to be, and then provide (e.g., display data representing) the results to a user.

A user may then select one of the relevant case histories, as at 510. If the user selects one of the relevant cast histories, it may be an indication that the machine learning model was successful in finding a relevant case history, and may be trained/reinforced with the affirmative conclusion, as at 512. Otherwise, the machine learning model may adjust/lower the confidence associated with the searching decisions that were made, as at 514. Accordingly, the machine learning model may be trained continuously during implementation.

The display of the relevant case histories to the user may be in the form of selectable case histories, e.g., icons representing digital files, as shown in FIG. 1. The user may select these case histories and review the reports therein to assist with interpreting the image(s) acquired prior to the search. In response to these images, a user may take additional images in different modalities, e.g., to determine whether the patient's condition is consistent with the relevant case history, e.g., if the relevant case history includes one or more images captured in different modalities. The case histories may also provide information about additional examinations, tests, or other actions to take to ascertain appropriate courses of treatment, etc. Thus, the technical effect of providing computer-implemented, multi-modality image and text searching for case histories based on images and text may permit a user to leverage the large amount of case history and image data that is available, without having to rely on searches that may not accurately cross imaging modalities.

Figure 6:
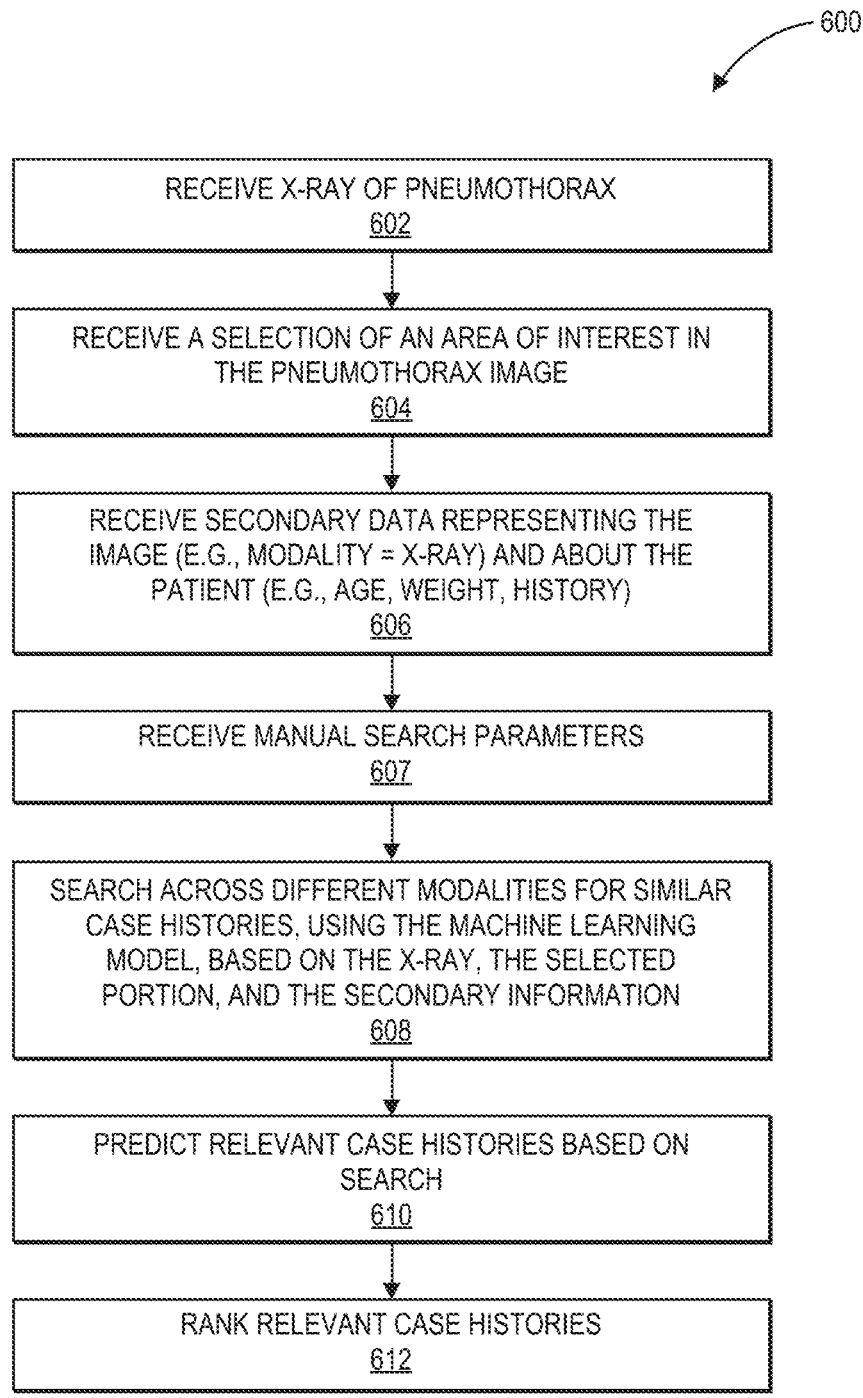
FIG. 6 illustrates a flowchart of a method for predicting relevant results for one specific example.

FIG. 6 illustrates a flowchart of a method 600 for searching a multi-modality image and case history database using a machine learning model, according to an example. Although illustrated in a specific order, it will be appreciated that the worksteps of the method 500 may be executed in any order, without departing from the scope of the present disclosure. Further, individual worksteps may be executed in parallel or iterated two or more times before proceeding to a subsequent worksteps. Additionally, individual worksteps may be partitioned into two or more worksteps, or any two or more of the worksteps may be combined into one.

In particular, in this specific, illustrative example, an X-ray of a pneumothorax is the image to be searched, which may be received at 602. This example of the method 600 employs the database entry 300 of FIG. 3, and reference will be made thereto to describe the method 600 in greater detail. Specifically, the image 302 is received at 602.

A user may also indicate a selection of an area of interest 304 in the image 302, which may be received, as at 604. Further, the image 302 may be associated with secondary information, such as the headers 306-318 which may be received as input, as at 606. Such secondary information may include, among other things, information about the image, the selected area within the image, the patient, or a combination thereof. Specifically, as discussed above, the headers 306-318 may represent contrast, annotation coordinates, area of the marked annotated, modality, slide location, pixel spacing, image position, view position, etc.

The user can, in some examples, also enter manual search parameters, as at 607, which may be employed to modify the search results based on user preference, expertise, etc. For example, a user can specify gender, age, etc., limitations on exclusions for the search results via the manual search parameters, and the machine learning model may respond by rewarding, penalizing, or excluding the search results based on the search parameters.

Using these inputs, a trained machine learning model can search a database of images of a plurality of modalities (including one or more modalities that differ from the X-ray/first modality of the image received at 602) and associated case histories, in order to return one or more case histories that are predicted to be relevant to interpreting the image received at 602, as at 608. For example, the machine learning model may employ a combination of the X-ray image, the selection, and the secondary information to search through images of other X-rays of the pneumothorax, other types (modalities) of images of the pneumothorax, X-rays of other areas of the body, and other types of images of other areas of the body. Thus, the image, the selected area, and the secondary information may be a starting point for a search, which the machine learning model may use to link the image to case histories for other patients, i.e., those with more mature case histories. This may provide insight into the diagnosis, treatment, and outcome for the other patent, thus predicting a case history that the current patient's condition may follow.

Accordingly, rather than simply searching for case histories based on image similarity or specific factors, the machine learning model may predict relevant case histories based on any patterns that develop from the training data, as at 610. Further, in at least some examples, the method 600 may include ranking the relevant case histories, as at 612, e.g., based on the machine learning model's confidence in its prediction. A user can then review the predicted case histories, images, and other data associated therewith for insights into the patient's condition, e.g., for interpreting the image itself and/or for establishing future courses of action.

Figure 7:
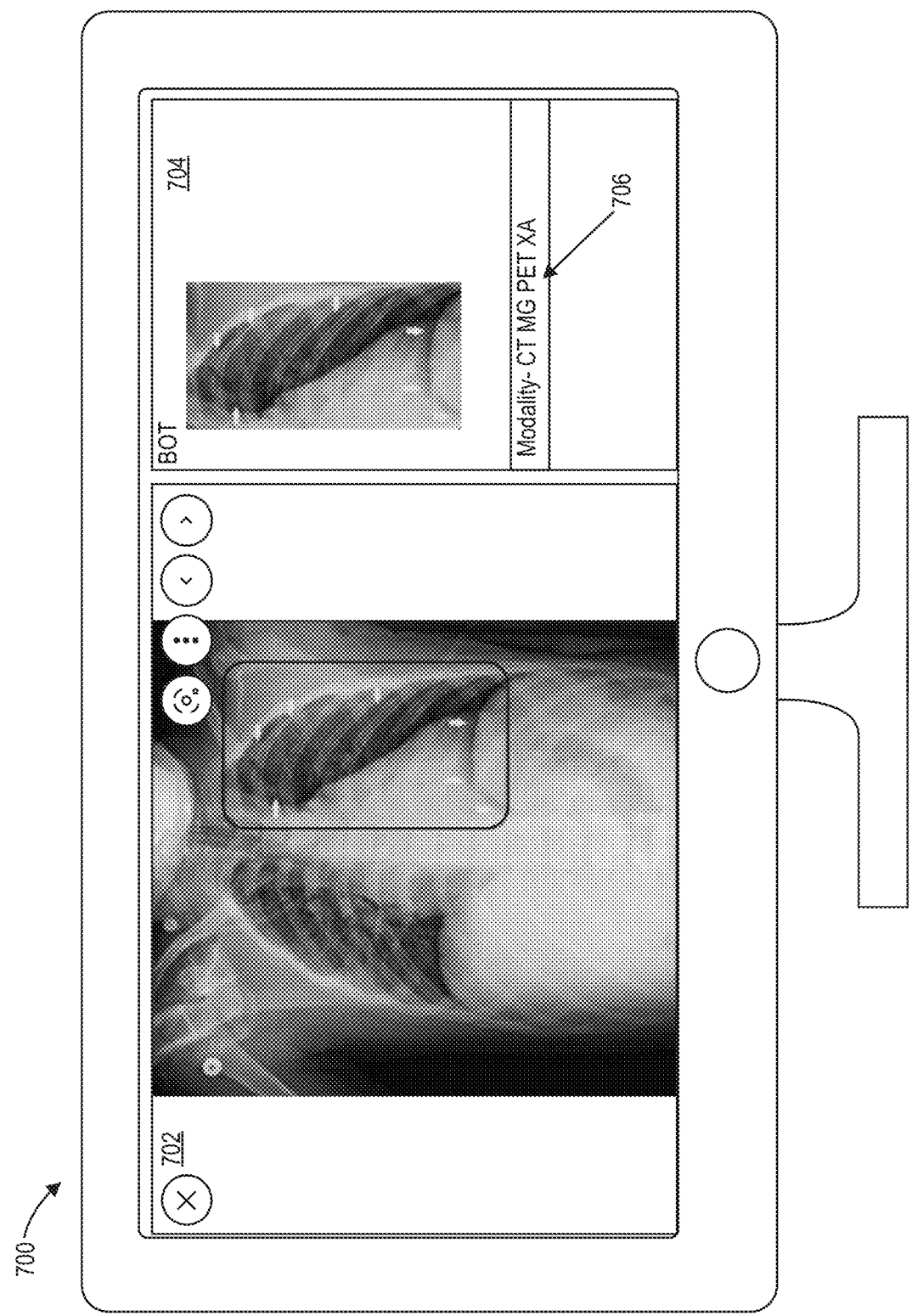
FIG. 7 illustrates a medical image and secondary input for the image for the specific example of the method of FIG. 6.
Figure 8:
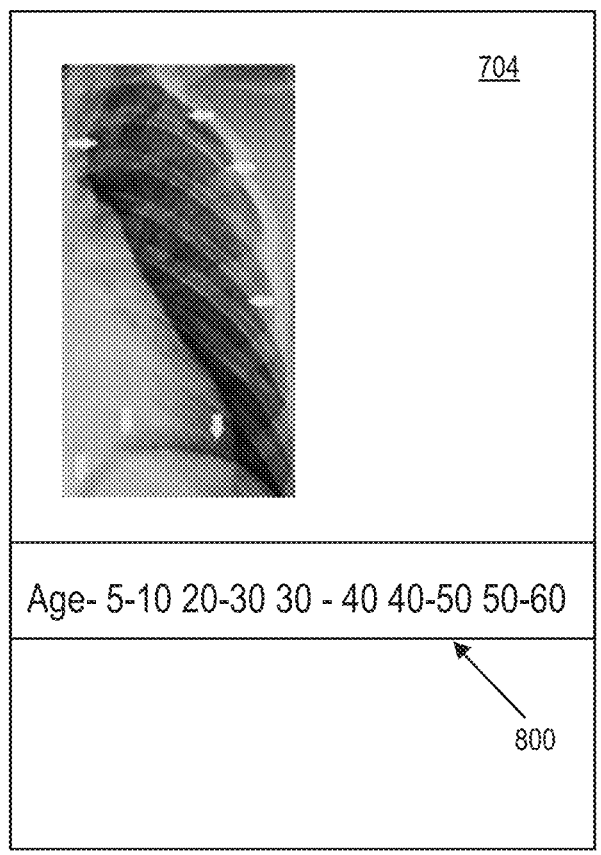
FIG. 8 illustrates a medical image with search parameters inputted therein, according to an example.

FIG. 7 illustrates a view of a user interface 700 for inputting the first data, e.g., what may be received in blocks 602-606 of FIG. 6. In this case, the X-ray image of the pneumothorax 702 is inputted. A user may draw a box around or otherwise annotated the X-ray image of the pneumothorax 702, which may be displayed or otherwise appear in a separate window 704, or may be hidden from the user. Further, the user may input secondary information, such as the modality of the image (in this case, X-ray), as indicated at 706. As shown in FIG. 8, manual search parameters 800, such as those received in block 607 of FIG. 6. The manual search parameters, in this case, may specify an age range, such that case histories for patients outside of this age range may be excluded or penalized in the rankings.

Figure 9:
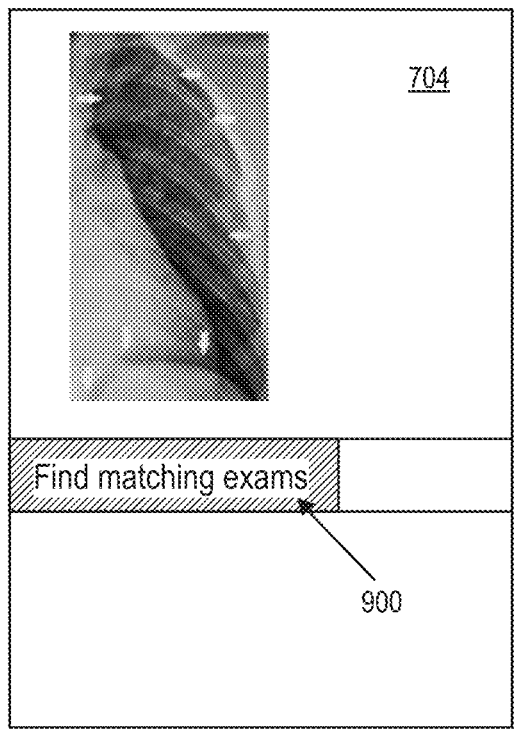
FIG. 9 illustrates a user interface for executing a predictive search using the machine learning model, once input data has been entered, according to an example.
Figure 10:
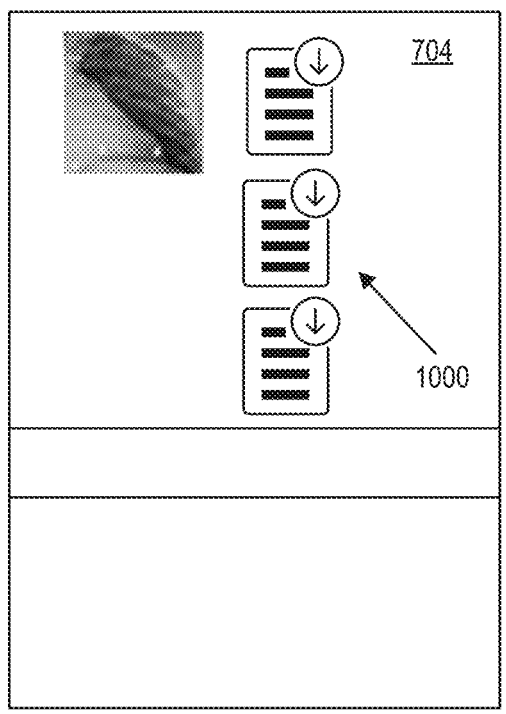
FIG. 10 illustrates the user interface with one or more (e.g., three) predicted relevant results (e.g., case histories) returned as the output of the search, according to an example.

As shown in FIG. 9, once the images, selections, secondary information, and search parameters (or any subset thereof) are entered, the user interface 700 may provide a button 900 to initiate the machine learning model's prediction or "search" of the database. Proceeding to FIG. 10, the search may return a list of results 1000, which may be ranked, unsorted, or otherwise ordered for display. The list 1000 may be provided in the form of icons, which may link to the case histories, such that a user of the user interface 700 may quickly bring up and view the case histories to assist in the interpretation of the image 702.

Figure 11:
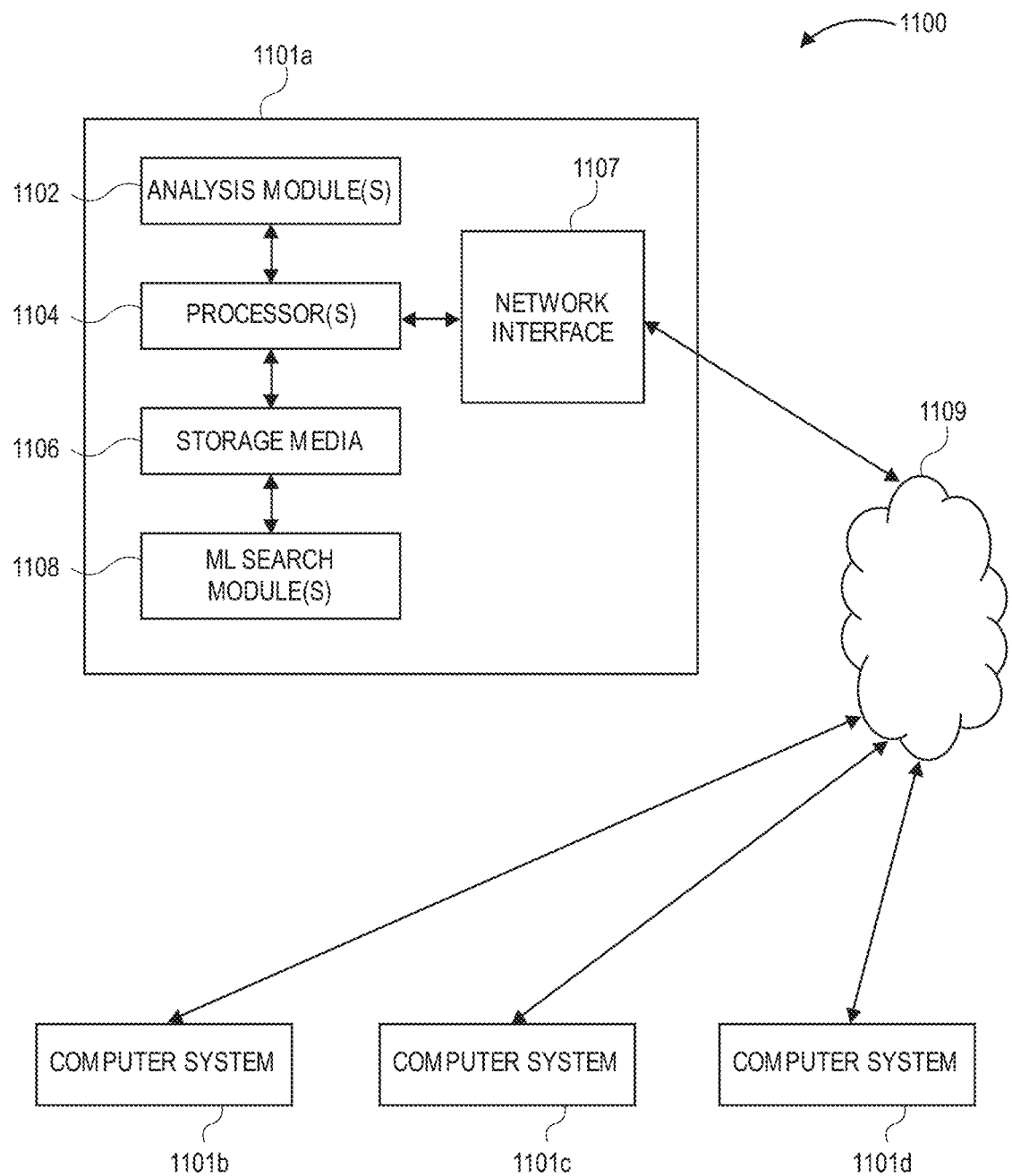
FIG. 11 illustrates a schematic view of a computing system, according to an example.

In some examples, any of the methods of the present disclosure may be executed by a computing system. FIG. 11 illustrates an example of such a computing system 1100, in accordance with some examples. The computing system 1100 may include a computer or computer system 1101A, which may be an individual computer system 1101A or an arrangement of distributed computer systems (each including one or more processors). The computer system 1101A includes one or more analysis module(s) 1102 configured to perform various tasks according to some examples, such as one or more methods disclosed herein. To perform these various tasks, the analysis module 1102 executes independently, or in coordination with, one or more processors 1104, which is (or are) connected to one or more storage media 1106. The processor(s) 1104 is (or are) also connected to a network interface 1107 to allow the computer system 1101A to communicate over a data network 1109 with one or more additional computer systems and/or computing systems, such as 1101B, 1101C, and/or 1101D (note that computer systems 1101B, 1101C and/or 1101D may or may not share the same architecture as computer system 1101A, and may be located in different physical locations, e.g., computer systems 1101A and 1101B may be located in a processing facility, while in communication with one or more computer systems such as 1101C and/or 1101D that are located in one or more data centers, and/or located in varying countries on different continents).

A processor can include a microprocessor, microcontroller, processor module or subsystem, programmable integrated circuit, programmable gate array, or another control or computing device.

The storage media 1106 can be implemented as one or more computer-readable or machine-readable storage media. Note that while in the example of FIG. 11 storage media 1106 is depicted as within computer system 1101A, in some examples, storage media 1106 may be distributed within and/or across multiple internal and/or external enclosures of computing system 1101A and/or additional computing systems. Storage media 1106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some examples, computing system 1100 contains one or more machine learning (ML) search module(s) 1108. In the example of computing system 1100, computer system 1101A includes the ML search module 1108. In some examples, a single ML search module may be used to perform some or all aspects of one or more examples of the methods. In alternate examples, a plurality of ML search modules may be used to perform some or all aspects of methods.

It should be appreciated that computing system 1100 is only one example of a computing system, and that computing system 1100 may have more or fewer components than shown, may combine additional components not depicted in the example of FIG. 11, and/or computing system 1100 may have a different configuration or arrangement of the components depicted in FIG. 11. The various components shown in FIG. 10 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method, comprising:
receiving an image of a portion of a body of a patient, wherein the image was acquired using a first modality;
receiving a selection of an area of interest of the image;
receiving secondary information about the image, the patient, or both;
predicting, using a machine learning model, one or more relevant case histories in a database comprising case histories and images captured in a plurality of modalities including at least one modality that is different from the first modality, wherein the images are each linked with at least one case history, and wherein the machine learning model is trained to predict the one or more relevant case histories based at least partially on the image, the area of interest, and the secondary information; and
displaying data representing the one or more relevant case histories.

2. The method of claim 1, wherein the image is stored in an image file comprising a header that represents the secondary information, the secondary information comprising an identification of the first modality, demographic data of the patient, and information about acquisition parameters of the image.

3. The method of claim 1, further comprising receiving one or more manual search parameters that limit the relevant case histories.

4. The method of claim 1, further comprising ranking the one or more relevant case histories based on a confidence level associated therewith by the machine learning model.

5. The method of claim 1, further comprising adjusting the machine learning model in response to a user identifying at least one of the one or more relevant case histories as being relevant.

6. The method of claim 1, further comprising:
receiving a plurality of training images, selections of one or more areas of interest within the respective training images, and secondary information about the respective training images, patients from which the respective training images were captured, or both;
obtaining case histories of patients associated with the plurality of training images;
linking the case histories with the training images, the selections of the one or more areas of interest, and the secondary information in the database; and
training the machine learning model, using the training images, the one or more areas of interest, and the secondary information linked with the case histories, to predict relevant case histories based on an image, one or more areas of interest within the image, and secondary information.

7. The method of claim 5, further comprising parsing the case histories using natural language processing, wherein training the machine learning model comprises training using the parsed case histories.

8. The method of claim 7, wherein the case histories each comprise at least one of an examination report, a discharge report, or a test result about a patient.

9. The method of claim 1, whereby the one or more relevant case histories are used to interpret the image.

10. A computing system, comprising:
one or more processors; and
a memory system including one or more non-transitory, computer-readable media storing instructions that, when executed by at least one of the one or more processors, cause the computing system to perform operations, the operations comprising:
receiving an image of a portion of a body of a patient, wherein the image was acquired using a first modality;
receiving a selection of an area of interest of the image;
receiving secondary information about the image, the patient, or both;
predicting, using a machine learning model, one or more relevant case histories in a database comprising case histories and images captured in a plurality of modalities including at least one modality that is different from the first modality, wherein the images are each linked with at least one case history, and wherein the machine learning model is trained to predict the one or more relevant case histories based at least partially on the image, the area of interest, and the secondary information; and
displaying data representing the one or more relevant case histories.

11. The computing system of claim 10, wherein the image is stored in an image file comprising a header that represents information comprising an identification of the first modality, demographic data of the patient, and information about acquisition parameters of the image.

12. The computing system of claim 10, wherein the operations further comprise receiving one or more manual search parameters that limit the relevant case histories.

13. The computing system of claim 10, wherein the operations further comprise ranking the one or more relevant case histories based on a confidence level associated therewith by the machine learning model.

14. The computing system of claim 10, wherein the operations further comprise adjusting the machine learning model in response to a user identifying at least one of the one or more relevant case histories as being relevant.

15. The computing system of claim 10, wherein the operations further comprise:
receiving a plurality of training images, selections of one or more areas of interest within the respective training images, and secondary information about the respective training images, patients from which the respective training images were captured, or both;
obtaining case histories of patients associated with the plurality of training images;
linking the case histories with the training images, the selections of the one or more areas of interest, and the secondary information in the database; and
training the machine learning model, using the training images, the one or more areas of interest, and the secondary information linked with the case histories, to predict relevant case histories based on an image, one or more areas of interest within the image, and secondary information.

16. The computing system of claim 15, wherein the operations further comprise parsing the case histories using natural language processing, wherein training the machine learning model comprises training using the parsed case histories.

17. The computing system of claim 10, wherein the case histories each comprise at least one of an examination report, a discharge report, or a test result about a patient.

18. A non-transitory, computer-readable medium storing instructions that, when executed by at least one processor of a computing system, cause the computing system to perform operations, the operations comprising:
receiving an image of a portion of a body of a patient, wherein the image was acquired using a first modality;
receiving a selection of an area of interest of the image;
receiving secondary information about the image, the patient, or both;
predicting, using a machine learning model, one or more relevant case histories in a database comprising case histories and images captured in a plurality of modalities including at least one modality that is different from the first modality, wherein the images are each linked with at least one case history, and wherein the machine learning model is trained to predict the one or more relevant case histories based at least partially on the image, the area of interest, and the secondary information; and
displaying data representing the one or more relevant case histories.

19. The non-transitory, computer-readable medium of claim 18, wherein the image is stored in an image file comprising a header that represents information comprising an identification of the first modality, demographic data of the patient, and information about acquisition parameters of the image.

20. The non-transitory, computer-readable medium of claim 18, wherein the operations further comprise:
receiving a plurality of training images, selections of one or more areas of interest within the respective training images, and secondary information about the respective training images, patients from which the respective training images were captured, or both;
obtaining case histories of patients associated with the plurality of training images;
linking the case histories with the training images, the selections of the one or more areas of interest, and the secondary information in the database; and
training the machine learning model, using the training images, the one or more areas of interest, and the secondary information linked with the case histories, to predict relevant case histories based on an image, one or more areas of interest within the image, and secondary information.

* * * * *